US012253589B2

(12) United States Patent
Chi

(10) Patent No.: US 12,253,589 B2
(45) Date of Patent: Mar. 18, 2025

(54) RADAR APPARATUS AND INTERFERENCE SUPPRESSION METHOD

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 606 days.

(21) Appl. No.: 17/494,794

(22) Filed: Oct. 5, 2021

(65) Prior Publication Data

US 2023/0035632 A1 Feb. 2, 2023

(30) Foreign Application Priority Data

Jul. 29, 2021 (TW) .................................. 110127877

(51) Int. Cl.
*G01S 13/32* (2006.01)
*G01S 7/02* (2006.01)
*G01S 7/28* (2006.01)

(52) U.S. Cl.
CPC .............. *G01S 13/32* (2013.01); *G01S 7/023* (2013.01); *G01S 7/2813* (2013.01)

(58) Field of Classification Search
None
See application file for complete search history.

(56) References Cited

U.S. PATENT DOCUMENTS

| 3,728,725 | A | * | 4/1973 | Bauer | G01S 7/06 342/182 |
| 5,194,871 | A | * | 3/1993 | Counselman, III | G01C 15/00 342/450 |
| 5,254,999 | A | * | 10/1993 | Lee | G01S 7/2923 342/185 |
| 8,552,744 | B2 | * | 10/2013 | Michalski | G01F 23/284 324/637 |
| 10,637,641 | B2 | * | 4/2020 | Iranpour | H04J 3/0638 |

(Continued)

FOREIGN PATENT DOCUMENTS

| CN | 1596488 | 3/2005 |
| CN | 102590829 | 7/2012 |

(Continued)

OTHER PUBLICATIONS

"Office Action of Taiwan Counterpart Application", issued on Mar. 22, 2022, p. 1-p. 4.

*Primary Examiner* — Vladimir Magloire
*Assistant Examiner* — Eric K Hodac
(74) *Attorney, Agent, or Firm* — JCIPRNET

(57) ABSTRACT

A radar apparatus and an interference suppression method are provided. The radar apparatus includes a clock generator, an analog to digital converter (ADC), and a notch filter. The clock generator is configured to generate a sampling frequency. The ADC is coupled to the clock generator, and is configured to convert an analog signal into a digital signal according to the sampling frequency. The notch filter is coupled to the ADC, and is configured to attenuate one or more interfered frequencies of the digital signal. The interfered frequencies are related to the sampling frequency. Accordingly, the interference at a specific frequency and harmonics thereof may be suppressed.

20 Claims, 11 Drawing Sheets

(56) References Cited

U.S. PATENT DOCUMENTS

| | | | | |
|---|---|---|---|---|
| 2002/0175815 A1* | 11/2002 | Baldwin | ................ | H05B 47/13 |
| | | | | 250/221 |
| 2014/0327902 A1 | 11/2014 | Giger et al. | | |
| 2016/0072520 A1* | 3/2016 | Pagnanelli | ............ | H03M 3/358 |
| | | | | 341/143 |
| 2016/0097846 A1* | 4/2016 | Mortensen | .......... | G01S 7/52034 |
| | | | | 367/97 |
| 2017/0307729 A1 | 10/2017 | Eshraghi et al. | | |
| 2020/0191937 A1 | 6/2020 | Farley et al. | | |
| 2021/0167498 A1* | 6/2021 | Tanimura | ................. | H01Q 3/24 |

FOREIGN PATENT DOCUMENTS

| | | | | |
|---|---|---|---|---|
| CN | 109981107 | | 7/2019 | |
| CN | 110418975 | | 11/2019 | |
| JP | H09261954 A | * | 10/1997 | ............. H02M 3/28 |
| TW | 201937860 | | 9/2019 | |
| WO | 2006080457 | | 8/2006 | |
| WO | 2011142394 | | 11/2011 | |

\* cited by examiner

RADAR APPARATUS AND INTERFERENCE SUPPRESSION METHOD

CROSS-REFERENCE TO RELATED APPLICATION

This application claims the priority benefit of Taiwan application serial no. 110127877, filed on Jul. 29, 2021. The entirety of the above-mentioned patent application is hereby incorporated by reference herein and made a part of this specification.

BACKGROUND

Technical Field

The disclosure relates to a radar technology, and more particularly, to a radar apparatus and an interference suppression method according to an embodiment of the disclosure.

Description of Related Art

Radar technology has been developed for many years. According to the type of the transmitted signal, radar technology may be roughly divided into two categories, which are pulse radars and continuous wave radars. The conventional pulse radars transmit periodic high-frequency pulses, while the continuous wave radars transmit continuous wave signals. With the rapid development of science and technology, in recent years, frequency modulated continuous wave (FMCW) radars have been widely used in various fields.

It is worth noting that a radar apparatus is often subjected to external interference, which affects a detection result of a target object. For example, FIG. 1 is a schematic view of a continuous wave (CW) Doppler radar R. Referring to FIG. 1, a transmitting circuit (such as an amplifier PA) of the Doppler radar R amplifies and outputs a radio frequency signal according to a carrier frequency provided by an oscillator LO, and transmits the radio frequency signal to the outside through a transmitting antenna TA. The transmitted radio frequency signal is reflected by an object O to form an echo signal SO. However, inevitably, there may be interference such as an alternating current (AC) power at 50 or 60 hertz (Hz) and harmonics thereof or other interference in the environment. Therefore, not only the echo signal SO, but also a co-channel interference IC and an adjacent-channel interference IAC may be received by a receiving antenna RA. Moreover, a received signal further forms a baseband or an intermediate frequency interference after passing through a receiving circuit (such as a noise amplifier LNA and a mixer MIX).

SUMMARY

A radar apparatus in the embodiment of the disclosure includes (but is not limited to) a clock generator, an analog to digital converter (ADC), and a notch filter. The clock generator is configured to generate a sampling frequency. The ADC is coupled to the clock generator, and is configured to convert an analog signal into a digital signal according to the sampling frequency. The notch filter is coupled to the ADC, and is configured to attenuate one or more interfered frequencies of the digital signal. The interfered frequencies are related to the sampling frequency.

On the other hand, an interference suppression method in the embodiment of the disclosure is suitable for a radar apparatus. The interference suppression method includes (but is not limited to) the following steps. A sampling frequency is generated. An analog signal is converted to a digital signal according to the sampling frequency. A frequency offset is estimated according to an interfering frequency of the digital signal, so that the interfering frequency falls within a notch frequency range. One or more interfered frequencies of the digital signal in the notch frequency range are attenuated. The interfered frequencies are related to the sampling frequency.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
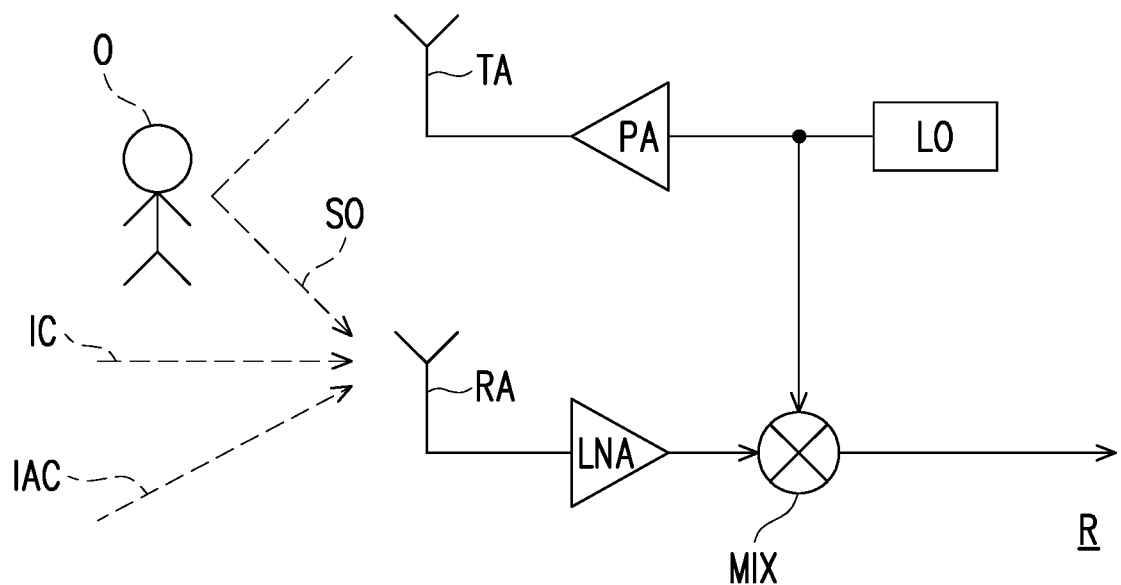
FIG. 1 is a schematic view of a continuous wave Doppler radar.
Figure 2:
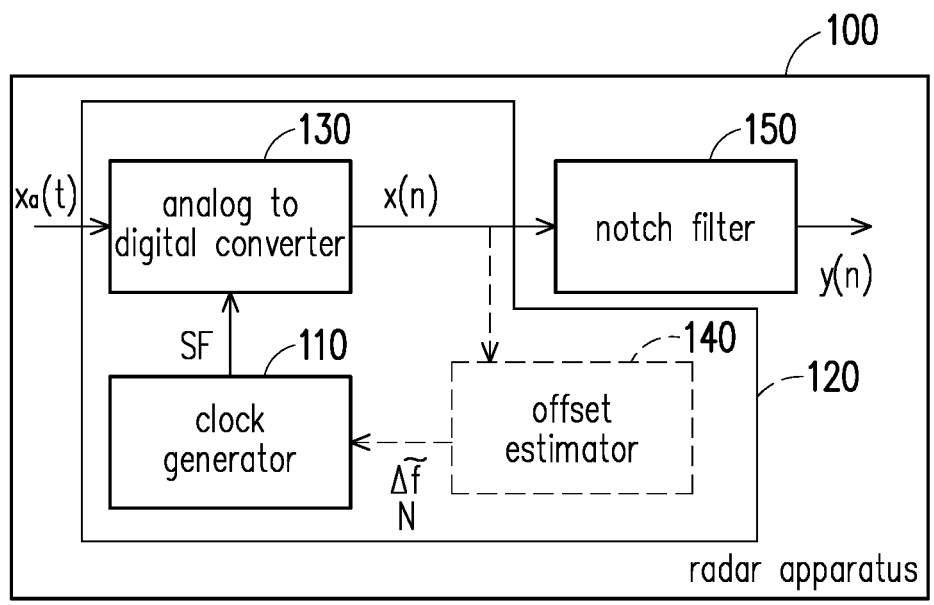
FIG. 2 is a block view of components of a radar apparatus according to an embodiment of the disclosure.

FIG. 2 is a block view of components of a radar apparatus 100 according to an embodiment of the disclosure. Referring to FIG. 2, the radar apparatus 100 includes (but is not limited to) a clock generator 110, an analog to digital converter 130, and a notch filter 150. The radar apparatus 100 may be applied to fields such as meteorology, speed measurement, reversing, topography, and military. The radar apparatus 100 may further include an offset estimator 140. The clock generator 110, the analog to digital converter 130, and the offset estimator 140 may form a sample frequency lock loop (SFLL) 120. Referring to FIG. 1 at the same time, the radar apparatus 100 may further include a transmitting circuit (such as an amplifier PA) to amplify and output a radio frequency signal according to a carrier frequency provided by an oscillator LO, and transmit the radio frequency signal to the outside through a transmitting antenna TA. The transmitted radio frequency signal is reflected by an object O to form an echo signal SO, which is received by a receiving circuit (such as a noise amplifier LNA and a mixer MIX) to form an analog signal $x_a(t)$ to be transmitted to the analog to digital converter 130. In an embodiment, the radar apparatus 100 may be a continuous wave (CW) Doppler radar, and the carrier frequency provided by the oscillator LO is fixed.

The clock generator 110 is configured to generate a sampling frequency SF for the analog to digital converter 130.

Figure 3:
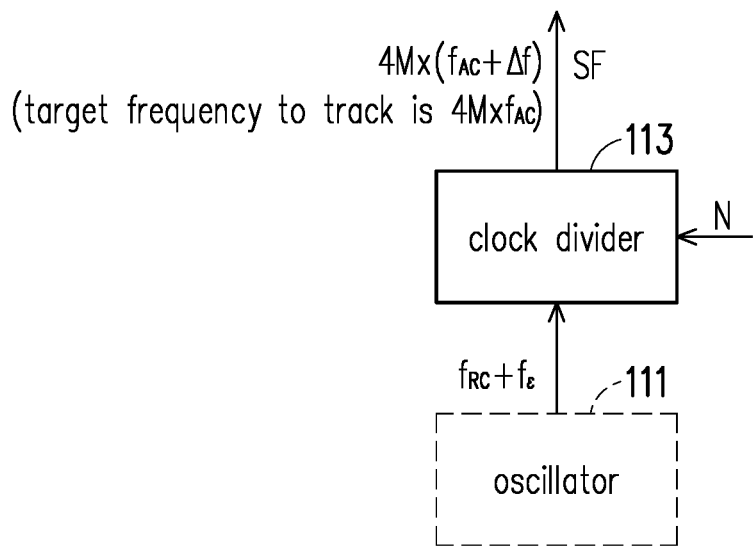
FIG. 3 is a block view of components of a clock generator according to an embodiment of the disclosure.

FIG. 3 is a block view of components of a clock generator according to an embodiment of the disclosure. Referring to FIG. 3, in an embodiment, the clock generator 110 includes an oscillator 111 and a clock divider 113. The oscillator 111 is configured to generate a clock signal with an oscillation frequency $f_{RC}$ (sometimes accompanied by a frequency offset $f_\epsilon$). The clock divider 113 is coupled to the oscillator 111, and is configured to generate the sampling frequency SF according to a multiple of decimation N and the clock signal provided by the oscillator 111. That is, the sampling frequency may be obtained by dividing the oscillation frequency $f_{RC}$ by the multiple of decimation N.

A target frequency of the sampling frequency SF is $4M \times f_{AC}$, where M is a multiple, and $f_{AC}$ is an interfered frequency. A decision of the target frequency will be described in detail later. However, if there is the frequency offset $f_\epsilon$, an actual frequency of the sampling frequency SF is $4M \times (f_{AC} + \Delta f)$, where $\Delta f$ is a frequency error, which will be described in detail later.

In another embodiment, the clock generator 110 includes the clock divider 113, and provides the clock signal through an external microcontroller or an RC oscillator. That is, the oscillator 111 in the the clock generator 110 could be omitted.

The analog to digital converter 130 is coupled to the clock generator 110. In an embodiment, the analog to digital converter 130 is configured to convert the analog signal $x_a(t)$ into a digital signal x(n) according to the sampling frequency SF. The analog signal $x_a(t)$ is an intermediate frequency signal obtained by mixing an echo signal of the radar apparatus 100. The analog to digital converter 130 samples the intermediate frequency signal (i.e., the analog signal $x_a(t)$) to convert the intermediate frequency signal from the analog signal in a continuous time domain to a digital discrete signal (or a digital sequence) in a discrete time domain, which is the digital signal x(n). The digital signal x(n) may be referred to as a baseband signal of the radar apparatus 100.

It is worth noting that the sampling frequency SF (or referred to as a sampling rate or a sampling speed) is one of important factors that affect a sampling result. It is assumed that the sampling frequency SF is twice a Nyquist frequency. In other words, the Nyquist frequency is half of the sampling frequency SF. In order to suppress interference, the sampling frequency SF is further related to one or more interfered frequencies to be suppressed.

In an embodiment, the sampling frequency SF is an integer multiple of a fundamental frequency in the one or more interfered frequencies. This integer multiple may be 1, 2, 3, 4, 5, or other integers. In an embodiment, the interfered frequency includes the fundamental frequency and one or more harmonic frequencies of the fundamental frequency.

Figure 4:
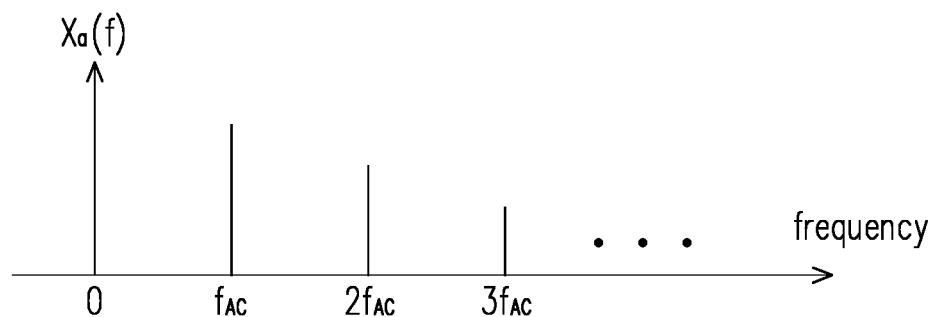
FIG. 4 is a frequency response of an analog signal according to an embodiment of the disclosure.

For example, FIG. 4 is a frequency response $X_a(f)$ of the analog signal $x_a(t)$ according to an embodiment of the disclosure. Referring to FIG. 4, it is assumed that a position of the radar apparatus 100 is interfered by electric power. Therefore, a frequency $f_{AC}$ used by the electric power and harmonic frequencies $2f_{AC}$ (i.e., twice $f_{AC}$) and $3f_{AC}$ (i.e., three times $f_{AC}$) thereof affect the analog signal $x_a(t)$. If the frequency $f_{AC}$ used by the electric power is taken as a fundamental frequency of the interfered frequency, the sampling frequency SF may be $4M \times f_{AC}$. In light of the above, the value of sampling frequency SF is related to the covered interfered frequency. However, the numbers of the fundamental frequencies and the harmonic frequencies of the covered interfered frequencies may still be changed according to actual requirements.

In an embodiment, the interfered frequencies are determined. For example, the interfered frequencies may be 50 or 60 hertz (Hz) used for the electric power. In another embodiment, the interfered frequency may also be another determined frequency, and may be changed according to user requirements. The embodiment of the disclosure is not limited thereto.

The notch filter 150 is coupled to the analog to digital converter 130. In an embodiment, in a notch frequency range of the notch filter 150, the notch filter 150 is configured to attenuate one or more interfered frequencies of the digital signal x(n), so as to achieve an effect of blocking some or all of the interfered frequencies from passing through. In other words, the radar apparatus 100 enables an interfering frequency to fall within the notch frequency range of the notch filter 150.

Figure 5:
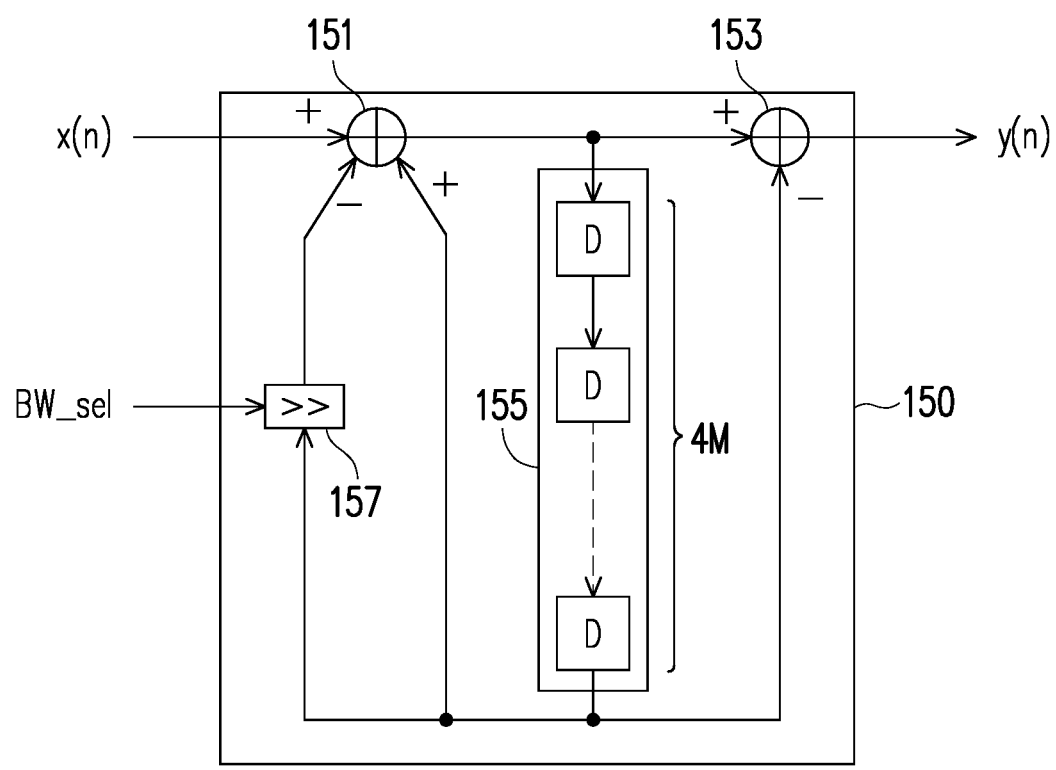
FIG. 5 is a block view of components of a notch filter according to an embodiment of the disclosure.

For example, FIG. 5 is a block view of components of the notch filter 150 according to an embodiment of the disclosure. Referring to FIG. 5, the notch filter 150 includes adders 151 and 153, a buffer 155, and a bandwidth selector 157.

The adder 151 is configured to add an output of the buffer 155 and the digital signal x(n), and subtract an output of the bandwidth selector 157 which is an output by inputting the output of the buffer 155 into the bandwidth selector 157. The adder 153 is configured to subtract an output of the adder 151 from the output of the buffer 155. The buffer 155 is a tapped delay-line and provides one or more delays D to temporarily store 4M discrete signals in the digital signal x(n). At this time, the sampling frequency SF is 4M times the fundamental frequency of the interfered frequency, and M is a positive integer. The bandwidth selector 157 is configured to change a bandwidth parameter BW_sel of an attenuated frequency.

The transfer function of the circuit diagram shown in FIG. 5 is given as:

$$H(z) = 1 - z^{-4M}/1 - \alpha z^{-4M} \tag{1}$$

A coefficient $\alpha$ is $1 - 2^{-BW\_sel}$, and the coefficient $\alpha$ approaches 1.

Figure 6:
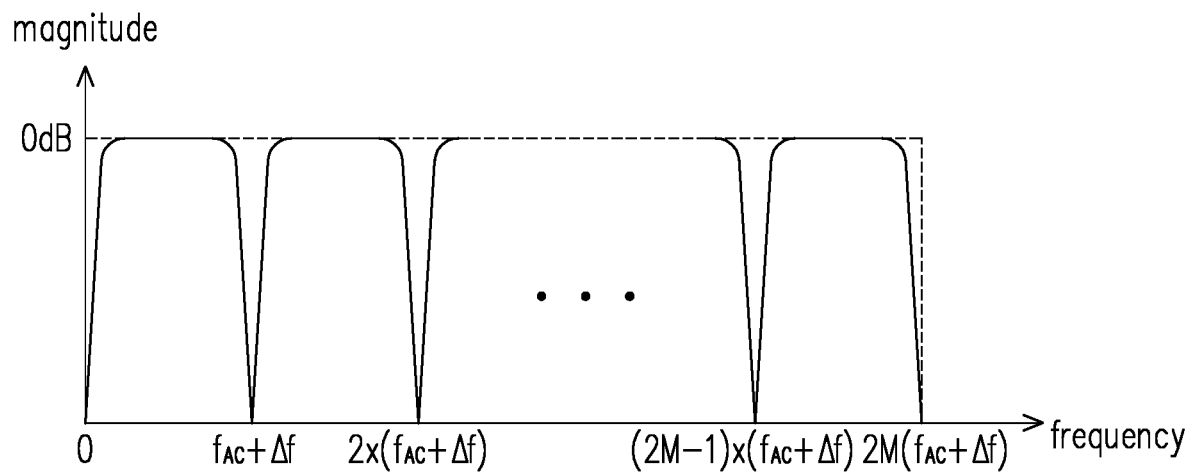
FIG. 6 is a frequency response of a notch filter according to an embodiment of the disclosure.

FIG. 6 a frequency response of the notch filter 150 according to an embodiment of the disclosure. Referring to FIG. 6, it is assumed that the Nyquist frequency is half of the sampling frequency SF, and a frequency error $\Delta f$ is ignored, that is, $2M \times f_{AC}$. Therefore, the notch filter 150 may attenuate the interfered frequencies $f_{AC}, 2f_{AC}, \ldots, (2M-1)f_{AC}$, and $2M \times f_{AC}$.

In an embodiment, the notch filter 150 may determine the number of the interfered frequencies. The number is related to the number of the discrete signals temporarily stored in the buffer 155. As shown in FIG. 6, the number is 2M. It should be noted that the number temporarily stored in the buffer 155 may still be changed according to the actual requirements, and the embodiment of the disclosure is not limited thereto.

Figure 7:
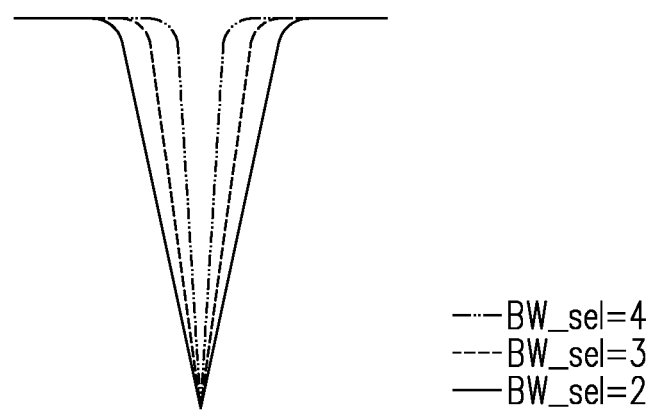
FIG. 7 is a partial enlarged view of a frequency response of a notch filter according to an embodiment of the disclosure.

FIG. 7 is a partial enlarged view of a frequency response of the notch filter 150 according to an embodiment of the disclosure. Referring to FIG. 7, for any one of the interfered frequencies, the bandwidth parameter BW_sel may change a bandwidth of a notch, that is, an attenuated frequency range (or the notch frequency range). The smaller the bandwidth parameter BW_sel, the larger the bandwidth of the notch. The larger the bandwidth parameter BW_sel, the smaller the bandwidth of the notch.

In light of the above, in the embodiment of the disclosure, the sampling frequency is related to the interfered frequency, and the fundamental frequency and the harmonic frequency thereof (i.e., harmonics) of the interfered frequency in the discrete time domain are attenuated, which may effectively suppress the interfered frequency.

Figure 8:
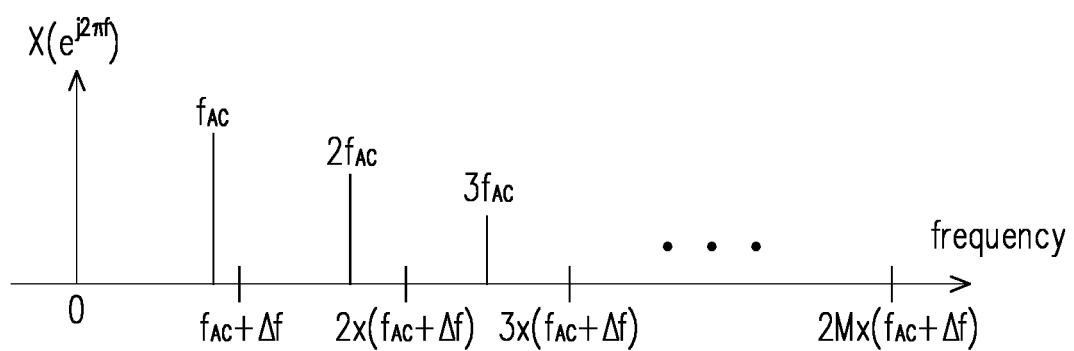
FIG. 8 is a frequency response of a sampling signal (through a frequency offset) according to an embodiment of the disclosure.

In some scenarios, the sampling frequency SF may be affected by the clock generator 110 (for example, the frequency offset $f_\varepsilon$) to form the frequency error $\Delta f$. FIG. 8 is a frequency response $X(e^{j2\pi f})$ of the sampled signal SF (through the frequency offset $f_\varepsilon$) according to an embodiment of the disclosure. Referring to FIG. 8, assuming that the target frequency of the sampling frequency SF is $4M \times f_{AC}$, but the actual frequency is $4M \times (f_{AC} + \Delta f)$. Compared with the interfered frequencies $f_{AC}$, $2f_{AC}$, ..., $(2M-1)f_{AC}$, and $2M \times f_{AC}$, there are deviations. In addition, the notch filter 150 attenuates the signal according to the actual sampling frequency. If the sampling frequency SF forms the frequency error $\Delta f$ due to the frequency offset, it is possible that a part of or all of the interference at a specific frequency may not be suppressed. Therefore, it is necessary to correct the sampling frequency SF to improve the suppression capability.

Referring to FIG. 2, as previously described, in an embodiment, in addition to the clock generator 110, the analog to digital converter 130, and the notch filter 150, the radar apparatus 100 may further include the offset estimator 140. The offset estimator 140 is coupled to the analog to digital converter 130 and the clock generator 110. The offset estimator 140 is configured to estimate the frequency error $\Delta f$ (that is, obtain an estimated frequency error $\widehat{\Delta f}$) according to the digital signal x(n) or generate the multiple of decimation N related to the frequency error $\Delta f$ for the clock generator 110 to correct the sampling frequency SF. The frequency error is an offset of the sampling frequency SF, that is, the offset between the target frequency (for example, the determined interfered frequency) of the sampling frequency SF and the actual frequency. The clock generator 110 may adjust the sampling frequency SF according to the estimated frequency error $\widehat{\Delta f}$, and then the analog to digital converter 130 adjusts the sampling frequency SF according to the frequency error estimated by the digital signal x(n). In this way, the sample frequency lock loop 120 is formed.

Figure 9:
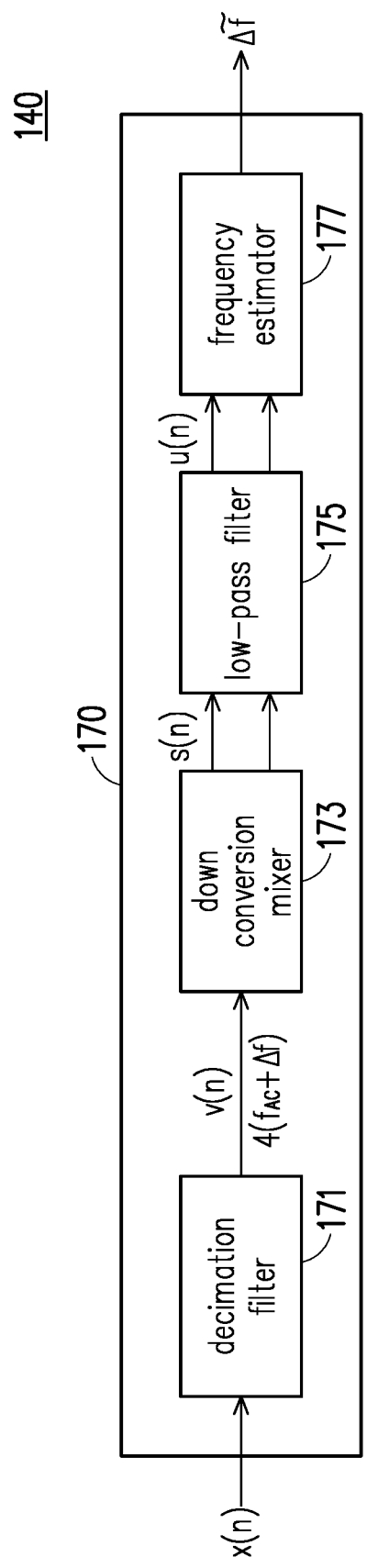
FIG. 9 is a block view of components of an offset estimator according to an embodiment of the disclosure.

FIG. 9 is a block view of components of the offset estimator 140 according to an embodiment of the disclosure. Referring to FIG. 9, the offset estimator 140 may include an offset estimation circuit 170. The offset estimation circuit 170 may include (but is not limited to) a decimation filter 171, a down conversion mixer 173, a low-pass filter 175, and a frequency estimator 177.

The decimation filter 171 is configured to receive the digital signal x(n), and perform a decimation processing to keep a fundamental frequency signal v(n) corresponding to a fundamental frequency ($f_{AC} + \Delta f$) in the digital signal x(n). That is, the actual frequency of sampling frequency SF is divided by a multiple M.

Figure 10:
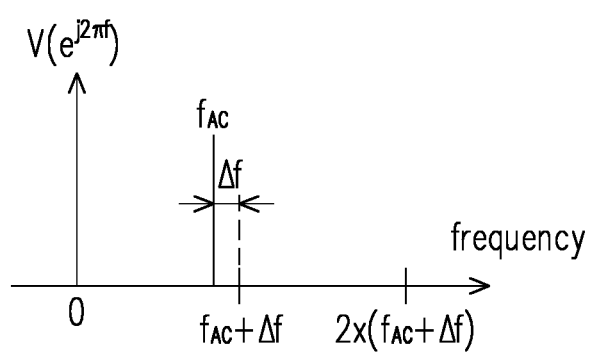
FIG. 10 is a frequency response of a fundamental frequency signal according to an embodiment of the disclosure.

FIG. 10 is a frequency response $V(e^{j2\pi f})$ of the fundamental frequency signal v(n) according to an embodiment of the disclosure. Referring to FIG. 10, at this time, the Nyquist frequency is 2 ($f_{AC} + \Delta f$), and the fundamental frequency signal v(n) only has the interfered frequency $f_{AC}$.

The down conversion mixer 173 is coupled to the decimation filter 171, and is configured to generate an error signal s(n) corresponding to the frequency error $\Delta f$ according to the fundamental frequency signal v(n). That is, the fundamental frequency signal v(n) is decimated.

Figure 11A:
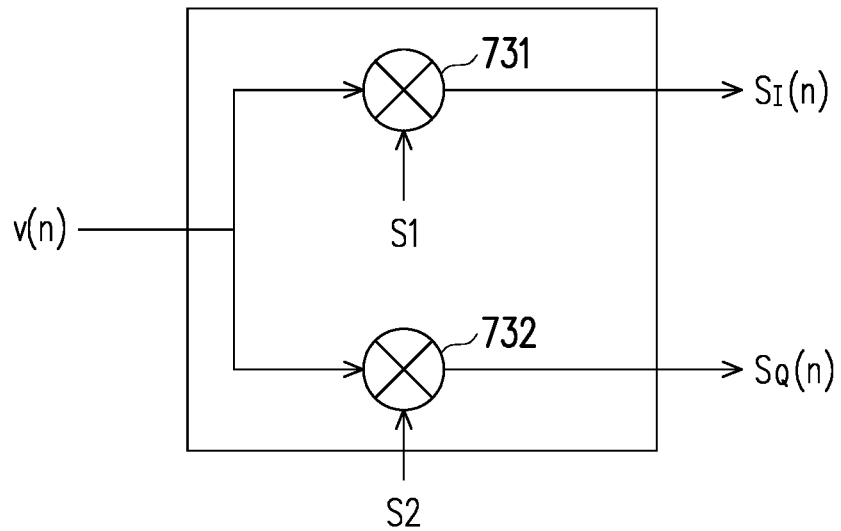
FIG. 11A is a schematic view of a down conversion mixer according to an embodiment of the disclosure.

FIG. 11A is a schematic view of the down conversion mixer 173 according to an embodiment of the disclosure. Referring to FIG. 11A, the down conversion mixer 173 respectively uses sequences S1 and S2 to mix the fundamental frequency signal v(n) through mixers 731 and 732. It is assumed that the sequence S1 is {+1, 0, −1, 0, +1, 0, −1, 0, ...}, and the sequence S2 is {0, −1, 0, +1, 0, −1, 0, +1, ...}. Accordingly, the down conversion mixer 173 may output an in-phase error signal $s_I(n)$ and an orthogonal error signal $s_Q(n)$. The error signal s(n) is $s_I(n)+s_Q(n)$. It should be noted that in other embodiments, the sequences S1 and S2 may be other sequences orthogonal to each other.

Figure 11B:
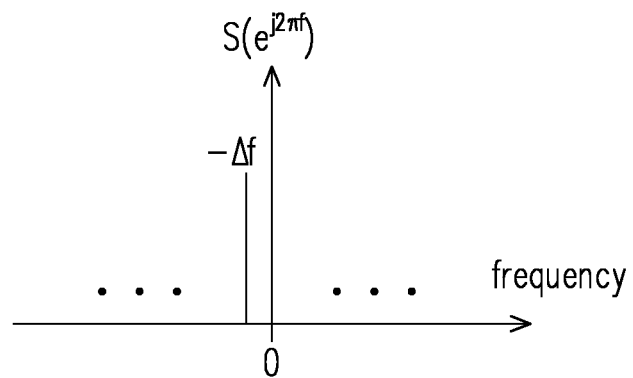
FIG. 11B is a frequency response of an error signal according to an embodiment of the disclosure.

FIG. 11B is a frequency response $S(e^{j2\pi f})$ of the error signal s(n) according to an embodiment of the disclosure. Referring to FIG. 11B, the error signal s(n) has a value at the negative frequency error $\Delta f$ in a frequency domain.

The low-pass filter 175 is coupled to the down conversion mixer 173. In an embodiment, the low-pass filter 175 is configured to filter the error signal s(n), so as to generate a filtered error signal u(n). The low-pass filter 175 may only keep the frequency response within a specific bandwidth, and accordingly only keep the value of the negative frequency error $\Delta f$ in the frequency domain.

The frequency estimator 177 is coupled to the low-pass filter 175. In an embodiment, the frequency estimator 177 is configured to estimate a frequency of the filtered error signal u(n), so as to obtain the frequency error $\Delta f$. The frequency estimator 177 may obtain the frequency error $\Delta f$ according to an estimated frequency of u(n).

It is assumed that a mathematical expression of the filtered error signal u(n) is:

$$u(n) = A \cdot e^{-j2\pi \frac{\Delta f}{f_s} n} \tag{2}$$

A is a gain, and $f_s$ is the sampling frequency FS. In order to estimate the frequency error $\Delta f$, Formula (2) may be converted into:

$$2\pi \left(\frac{\Delta f}{f_s}\right) = \angle \frac{u^*(n) \cdot u(n-1)}{\|u(n)\|^2} \approx \frac{Re\{u^*(n) \cdot u(n-1)\}}{\|u(n)\|^2} \tag{3}$$

Figure 12:
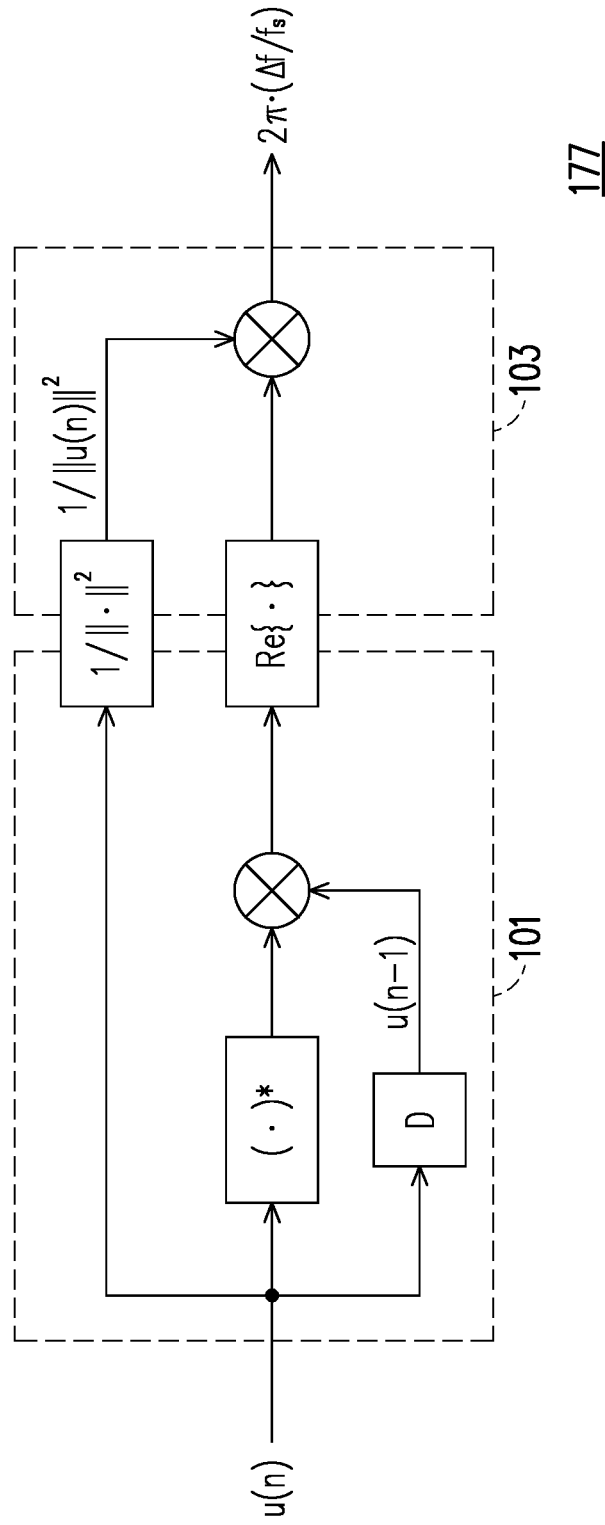
FIG. 12 is an equivalent schematic view of a frequency estimator according to an embodiment of the disclosure.

According to Formula (3), FIG. 12 is an equivalent schematic view of the frequency estimator 177 according to an embodiment of the disclosure. Referring to FIG. 12, the frequency estimator 177 respectively calculates a conjugate (which is (•)* in the figure) and the one-sample delayed value of the filtered error signal u(n), and multiplies two outputs to calculate a real number (which is Re(•) in the figure), so as to output Re{u*(n)·u(n−1)}. On the other hand, the frequency estimator 177 calculates a reciprocal of the filtered error signal u(n) squared (which is $1/\|\cdot\|^2$ in the figure), so as to output $1/\|u(n)\|^2$. With such demarcation, a left side of the figure is a complex value 101, and a right side of the figure is a real value 103. The frequency estimator 177 multiplies the two outputs (Re{u*(n)·u(n−1)} and $1/\|u(n)\|^2$) to obtain $$2\pi\left(\frac{\Delta f}{f_s}\right).$$

Since $f_s$ (the sampling frequency SF) is known, the frequency estimator 177 may obtain the estimated frequency error $\Delta \tilde{f}$.

Figure 13:
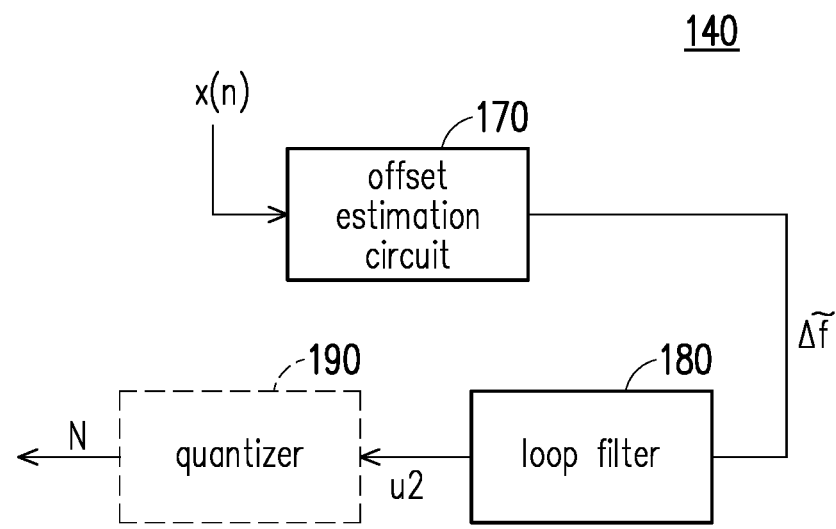
FIG. 13 is a block view of components of an offset estimator according to another embodiment of the disclosure.

FIG. 13 is a block view of components of the offset estimator 140 according to another embodiment of the disclosure. Referring to FIG. 13, in an embodiment, in addition to the offset estimation circuit 170, the offset estimator 140 may further include a loop filter 180. The loop filter 180 is coupled to the offset estimation circuit 170, and is configured to filter the estimated frequency error $\Delta \tilde{f}$, so as to generate a filtered error signal $u_2$. The clock generator 110 may adjust the sampling frequency SF according to the filtered error signal $u_2$, and then the analog to digital converter 130 adjusts the sampling frequency according to the frequency error estimated by the sampling digital signal x(n). In this way, the sample frequency lock loop 120 is formed.

In another embodiment, in addition to the offset estimation circuit 170, the offset estimator 140 may further include both the loop filter 180 and a quantizer 190. The quantizer 190 is coupled to the loop filter 180. The quantizer 190 is configured to quantize the filtered error signal $u_2$, so as to generate the multiple of decimation N. The multiple of decimation N may be an integer. The clock generator 110 adjusts the sampling frequency SF according to the multiple of decimation N, and then the analog to digital converter 130 adjusts the sampling frequency according to the frequency error estimated by the sampling digital signal x(n). In this way, the sample frequency lock loop 120 is formed. The quantizer 190 is, for example, a sigma-delta ($\Sigma\Delta$) quantizer.

Figure 14:
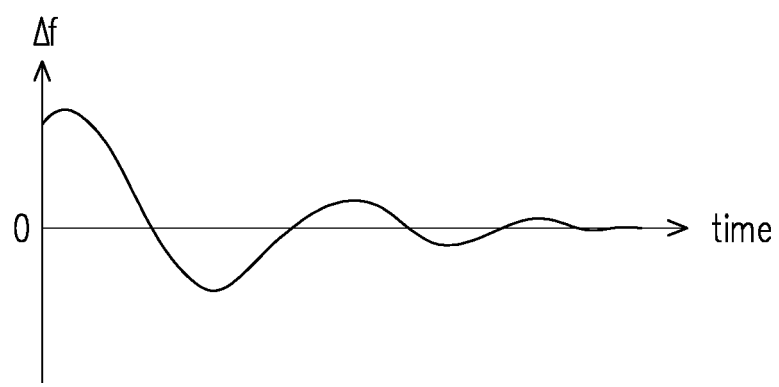
FIG. 14 is a schematic view of a frequency error versus time according to an embodiment of the disclosure.

Since the clock generator 110 receives the estimated frequency error $\Delta \tilde{f}$, the filtered error signal $u_2$, or the multiple of decimation N, the newly generated sampling frequency SF may compensate for the estimated frequency error $\Delta \tilde{f}$. FIG. 14 is a schematic view of the frequency error $\Delta f$ versus time converging to near zero in the sample frequency lock loop 120 according to an embodiment of the disclosure. Referring to FIG. 14, the frequency error $\Delta f$ may converge to near zero, and the frequency attenuated by the notch filter 150 may indeed be located at the interfered frequency and the harmonics thereof.

In an embodiment, regardless of a magnitude of the frequency error $\Delta f$, the notch filter 150 may attenuate the digital signals that are at the interfered frequency, and accordingly output an interfered and suppressed signal y(n).

In another embodiment, in response to the frequency error $\Delta f$ being greater than the an error threshold, the notch filter 150 may be disabled without attenuating the interfered frequencies of the digital signal. In response to the frequency error $\Delta f$ not being greater than the error threshold, the notch filter 150 may attenuate the interfered frequencies of the digital signal.

Figure 15:
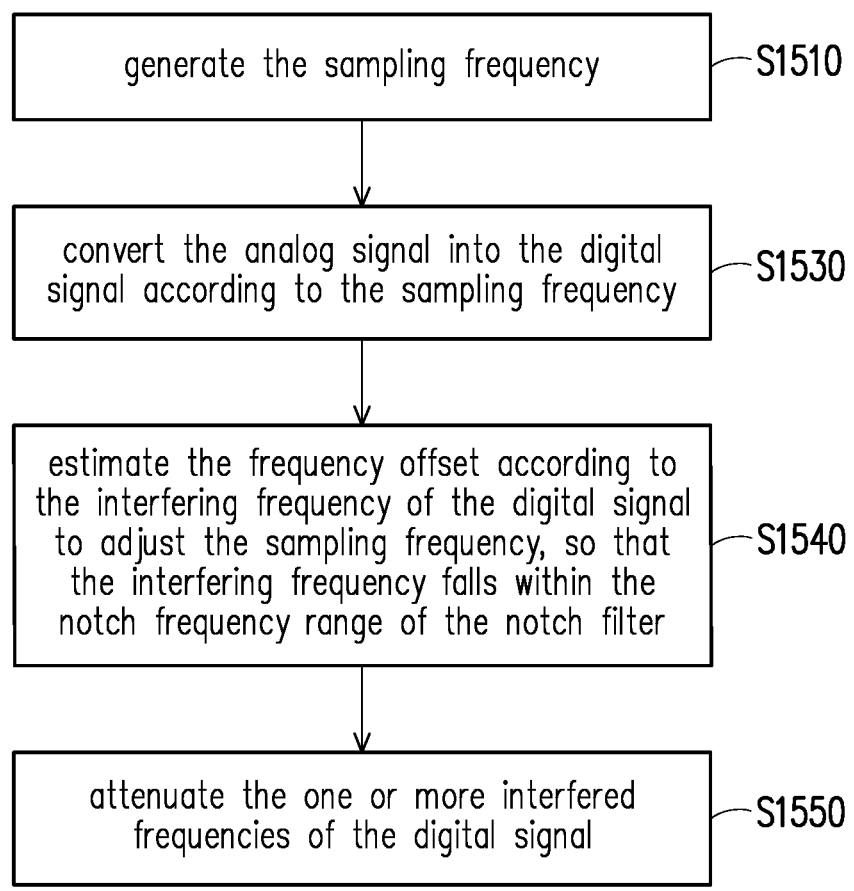
FIG. 15 is a flowchart of an interference suppression method according to an embodiment of the disclosure.

FIG. 15 is a flowchart of an interference suppression method according to an embodiment of the disclosure. Referring to FIGS. 2 and 15, the clock generator 110 generates the sampling frequency SF (step S1510). The analog to digital converter 130 converts the analog signal $x_a(t)$ into the digital signal x(n) according to the sampling frequency SF (step S1530). The offset estimator 140 estimates the frequency offset according to the interfering frequency of the digital signal x(n), so that the clock generator 110 adjusts the sampling frequency SF, and that the interfering frequency falls within the notch frequency range of the notch filter 150 (step S1540). In the notch frequency range, the notch filter 150 attenuates the one or more interfered frequencies of the digital signal x(n) (step S1550).

The implementation details of each of the steps in FIG. 15 are described in detail in the foregoing embodiments and implementation method. Thus, details in this regard will not be further reiterated in the following. In addition to being implemented in the form of a circuit, the steps and implementation details in the embodiment of the disclosure may also be implemented in the form of software by a processing unit. The embodiment of the disclosure is not limited thereto.

Based on the above, in the radar apparatus and the interference suppression method in the embodiment of the disclosure, the sampling frequency is set to be related to the interfered frequency, and the discrete signals located at the interfered frequencies are suppressed in the discrete time domain. In this way, the interference at the specific frequency and the harmonics thereof may be suppressed.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A radar apparatus, comprising:
a clock generator, configured to generate a sampling frequency;
an analog to digital converter, coupled to the clock generator, and configured to convert an analog signal into a digital signal according to the sampling frequency;
an offset estimator, coupled to the analog to digital converter and the clock generator, and configured to estimate a frequency offset according to an interfering frequency of the digital signal, to adjust the sampling frequency, so that the interfering frequency falls within a notch frequency range; and
a notch filter, coupled to the analog to digital converter, and configured to attenuate at least one interfered frequency of the digital signal in the notch frequency range, wherein the at least one interfered frequency is related to the sampling frequency.

2. The radar apparatus according to claim 1, wherein the sampling frequency is an integer multiple of a fundamental frequency of the at least one interfered frequency.

3. The radar apparatus according to claim 2, wherein the notch filter comprises:
a buffer, configured to temporarily store 4M discrete signals of the digital signal, wherein the sampling frequency is 4M times the fundamental frequency, and M is a positive integer.

4. The radar apparatus according to claim 2, wherein the at least one interfered frequency comprises the fundamental frequency and at least one harmonic frequency of the fundamental frequency.

5. The radar apparatus according to claim 1, wherein the offset estimator is further configured to estimate a frequency error according to the digital signal, wherein the frequency error is an offset of the sampling frequency, and the clock generator adjusts the sampling frequency according to the frequency error.

6. The radar apparatus according to claim 5, wherein the offset estimator comprises an offset estimation circuit, and the offset estimation circuit comprises:
a decimation filter, configured to perform a decimation processing on the digital signal to keep a fundamental frequency signal corresponding to a fundamental frequency in the digital signal;
a down conversion mixer, coupled to the decimation filter, and configured to generate an error signal corresponding to the frequency error according to the fundamental frequency signal;
a low-pass filter, coupled to the down conversion mixer, and configured to filter the error signal to generate a first filtered error signal; and
a frequency estimator, coupled to the low-pass filter, and configured to estimate a frequency of the first filtered error signal to obtain the frequency error.

7. The radar apparatus according to claim 5, wherein the offset estimator further comprises:
a loop filter, configured to filter the frequency error, to generate a second filtered error signal, wherein the clock generator adjusts the sampling frequency according to the second filtered error signal.

8. The radar apparatus according to claim 5, wherein the offset estimator further comprises:
a loop filter, configured to filter the frequency error, to generate a second filtered error signal; and
a quantizer, coupled to the loop filter and the clock generator, and configured to quantize the second filtered error signal, to generate a multiple of decimation, wherein the clock generator adjusts the sampling frequency according to the multiple of decimation.

9. The radar apparatus according to claim 1, wherein the clock generator further comprises:
a clock divider, configured to generate the sampling frequency according to a clock signal.

10. The radar apparatus according to claim 9, wherein the clock generator further comprises:
an oscillator, coupled to the clock divider, and configured to generate the clock signal.

11. The radar apparatus according to claim 1, wherein the at least one interfered frequency comprises 50 or 60 hertz (Hz).

12. The radar apparatus according to claim 1, further comprising:
a transmitting circuit, configured to transmit a radio frequency signal; and
a receiving circuit, configured to receive an echo signal, to generate the analog signal, wherein the echo signal is formed by reflecting the transmitted radio frequency signal by an object.

13. An interference suppression method suitable for a radar apparatus, comprising:
generating a sampling frequency;
converting an analog signal into a digital signal according to the sampling frequency;
estimating a frequency offset according to an interfering frequency of the digital signal, to adjust the sampling frequency, so that the interfering frequency falls within a notch frequency range of a notch filter; and
attenuating at least one interfered frequency of the digital signal in the notch frequency range of the notch filter by the notch filter, wherein the at least one interfered frequency is related to the sampling frequency.

14. The interference suppression method according to claim 13, wherein the sampling frequency is an integer multiple of a fundamental frequency of the at least one interfered frequency.

15. The interference suppression method according to claim 14, wherein attenuating the at least one interfered frequency of the digital signal comprises:
determining a number of the at least one interfered frequency, wherein the number is a number of discrete signals in the digital signal to be attenuated temporarily stored.

16. The interference suppression method according to claim 14, wherein the at least one interfered frequency comprises the fundamental frequency and at least one harmonic frequency of the fundamental frequency.

17. The interference suppression method according to claim 13, wherein estimating the frequency offset according to the interfering frequency of the digital signal to adjust the sampling frequency comprises:
estimating a frequency error according to the digital signal, wherein the frequency error is an offset between the sampling frequency and the interfering frequency; and
adjust the sampling frequency according to the frequency error.

18. The interference suppression method according to claim 17, wherein estimating the frequency error according to the digital signal comprises:
performing a decimation processing on the digital signal to keep a fundamental frequency signal corresponding to a fundamental frequency in the digital signal;
generating an error signal corresponding to the frequency error according to the fundamental frequency signal;
filtering the error signal to generate a first filtered error signal; and
estimating a frequency of the first filtered error signal to obtain the frequency error.

19. The interference suppression method according to claim 13, wherein the at least one interfered frequency comprises 50 or 60 Hz.

20. The interference suppression method according to claim 13, further comprising:
transmitting a radio frequency signal; and
generating the analog signal after receiving an echo signal, wherein the echo signal is formed by reflecting the transmitted radio frequency signal by an object.

* * * * *